XR 3,114,849

X 89454

Dec. 17, 1963 W. POSCHENRIEDER 3,114,849

ELECTROSTRICTIVE FLEXING OSCILLATOR

Filed Feb. 13, 1961

3,114,849
ELECTROSTRICTIVE FLEXING OSCILLATOR

Werner Poschenrieder, Munich, Germany, assignor to Siemens & Halske Aktiengesellschaft Berlin and Munich, a corporation of Germany Filed Feb. 13, 1961, Ser. No. 88,958
Claims priority, application Germany Mar. 7, 1960
4 Claims. (Cl. 310—9.7)

This invention is concerned with making and using an electrostrictive flexing or bending oscillator.

Flexing oscillators of this general kind, for use as electrostrictive microphone or telephone diaphragms, are known from the German Patent No. 1,065,880. They comprise several layers at least one of which is made of electrostrictive material. On each side of each electrostrictive layer is provided a disk shaped electrode, a voltage being responsive to flexing oscillations obtained at such electrodes or a voltage being placed thereon to produce flexing oscillations. In this kind of flexing oscillators, the transverse contraction of the electrostrictive material is utilized for the conversion of electrical energy into mechanical energy. Accordingly, the electromechanical coupling factor is necessarily only about one third of the coupling factor in the case of an oscillator in which the longitudinal contraction is utilized.

The object of the present invention is to utilize, in connection with a flexing oscillator made of electrostrictive material, for the electromechanical energy conversion, the longitudinal contraction of the electrostrictive material, thereby increasing the electromechanical coupling factor as compared with previously known flexing oscillators.

The object of the invention is realized by subdividing the surface of the flexing oscillator by means of strip-shaped electrically conductive material (conductor strips) into a plurality of zones extending perpendicularly to the flexing or bending axis, oppositely polarizing always two successive zones of the electrostrictive material, preferably in the outer layers thereof, and connecting the respective odd numbered and even numbered conductor strips by means of connecting lines which form the respective poles of the oscillator.

An example of the manner of producing such a flexing oscillator will now be given so as to aid the understanding of the operation thereof.

Electrically conductive material is in strip shape placed upon a disk shaped or elongated body made of electrostrictive material, for example, barium titanate, the thickness of such material amounting to one millimeter and even considerably less. The conductive material may, for example, be silver which is placed in any known and suitable manner on the electrostrictive member. The conductor strips subdivide the electrostrictive material into individual zones and these strips are in accordance with the invention so connected that the even numbered and the odd-numbered strips are respectively combined to form the two poles of the oscillator. The spacing between the conductor strips shall be smaller than the thickness of the flexing oscillator. A direct voltage is now placed on the two poles of the oscillator, such voltage, referred to the spacing of the conductor strips, amounting to about 600 volts per millimeter. This voltage produces in the zones between the conductor strips an electric field which polarizes the electrostrictive material, the polarization voltage being thereby, depending upon the formation of the electric field, highest in the surface parts of the electrostrictive member. The polarization of electrostrictive material causes, regardless of the sign of the polarization voltage, an alteration of the shape, for example, an elongation of the material in polarization direction. This means, applied to the present case, that the outer layers of the electrostrictive member are stretched, thus placing the member under tension. The flexing oscillator is in this condition heated to a degree at which the Curie temperature of the electrostrictive material is exceeded (in the case of barium titanate about 140° C.) and thereupon cooled down again. The polarization of the electrostrictive material and therewith the tensioning of the member, caused by the action of the direct voltage source, are thus preserved even upon disconnection of the voltage source. The polarization is in neighboring zones of the electrostrictive material oppositely oriented. Upon placing on the poles of a flexing oscillator, which had been prepared in this manner, a control voltage which is considerably lower than the direct voltage employed for the polarization, the tensioning will be either weakened or increased in the neighboring zones of the electrostrictive oscillator depending upon the polarity of the control voltage. The curvature of the flexing oscillator is thereby altered in neighboring zones in identical sense and the entire member is thus bent or flexed more or less in the identical sense of curvature.

The shape of the electrostrictive member may be different depending upon the use thereof. For example, it may be rectangular or circular; the conductor strips must be matched to the respective shape since they must always extend in a direction perpendicular to the desired bending or flexing axis. The rectangular shape of the flexing oscillator may be adopted, for example, when using it as a filter element or as a frequency determining element in the feedback coupling network of an oscillation generator whenever a high quality oscillation element is desired. The circularly shaped embodiment is suitable for use, for example, as a membrane or diaphragm for an electroacoustical converter. A matching to the surrounding sound medium is often desired for such a converter so as to obtain an electroacoustic efficiency as high as possible. Matching may be effected, for example, by making the electrostrictive member very thin, or by providing a mechanical member for transmitting the flexing motion thereof to a membrane. It is for this purpose also possible to fasten the electrostrictive material upon a disk shaped elastic carrier. In the case of a carrier in which surfaces with different curvature sense occur, for example, owing to the manner of mounting it, care should be taken that the electrostrictive material covers upon the carrier only surfaces with identical curvature sense.

The various objects and features of the invention will appear from the description of embodiments which will be rendered below with reference to the accompanying drawing.

Figure 5:
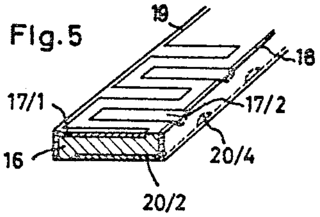
Figure 6:
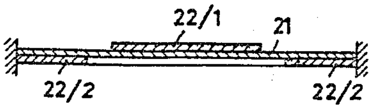
Figure 7:
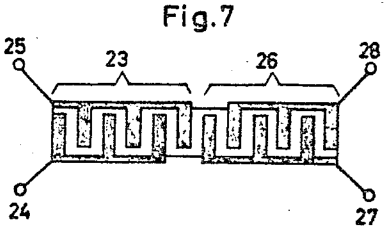

FIG. 5 indicates an embodiment in which the conductor strips are embedded in the electrostrictive material;

FIG. 6 shows, in section, an embodiment in which the electrostrictive material is provided upon a disk shaped elastic carrier; and FIG. 7 illustrates an elongated flexing oscillator constructed as a quadrupole.

Figure 1:
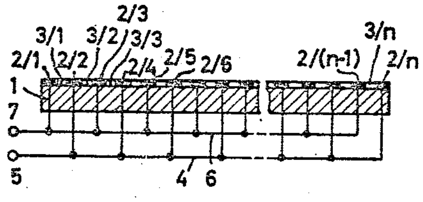
FIGS. 1 and 2 show respectively a longitudinal sectional and an elevational view of a rectangular flexing oscillator.
Figure 2:
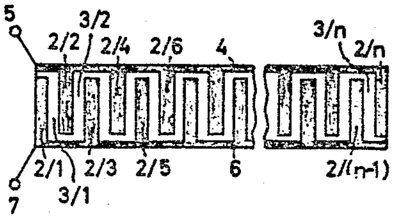

Referring now to FIGS. 1 and 2, the electrostrictive member 1 is about one millimeter thick and its surface is subdivided, by strip shaped electrically conductive material 2/1, 2/2 . . . 2/$n$, into several zones, 3/1, 3/2 . . . 3/$n$ extending perpendicularly to the flexing or bending axis. Successive zones of the electrostrictive material are preferably in the outer layers oppositely polarized. The manner in which such polarization is obtained has been described before. In the example shown in FIGS. 1 and 2, alternate or even numbered conductor strips 2/2, 2/4 . . . 2/$n$ are interconnected by a line 4 and form a pole 5. Intermediate or odd numbered conductor strips 2/1, 2/3 . . . 2/($n$—1) are interconnected by a line 6 and form a pole 7. The control voltage for the oscillator is placed on the poles 5 and 7.

The arrangement of the interconnecting lines 4 and 6 is particularly apparent from FIG. 2. The electrostrictive member is rectangular with a length considerably in excess of the width, thus forming an elongated oscillator. The electrically conductive material is provided upon the surface of the electrostrictive member in the form of transverse strips, alternate and intermediate strips being interconnected with electrically conductive material forming respectively the lines 4 and 6 along the edges of the electrostrictive member.

Figure 3:
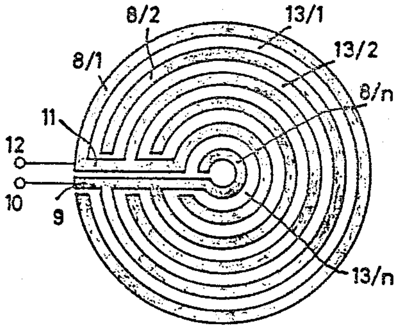
FIGS. 3 and 4 represent flexing oscillators in the form of circular disks.

In the embodiment according to FIG. 3, the electrostrictive member is in the form of a circular disk. The individual conductor strips are provided upon the disk in the form of concentric open rings 8/1, 8/2 . . . 8/$n$. The even numbered rings are interconnected by means of a line 9 forming one pole 10 of the flexing oscillator. The odd numbered rings are similarly interconnected by means of a line 11 which forms the other pole 12. Between the rings formed by the conductor strips extend circular zones 13/1, 13/2 . . . 13/$n$ of electrostrictive material, any two neighboring zones being oppositely polarized in the surface layers thereof.

Figure 4:
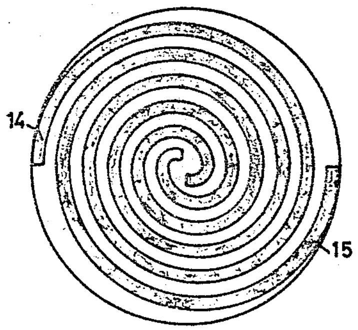

FIG. 4 shows another flexing oscillator of circular configuration. The conductor strips are in this case arranged in the form of two interlaced spirals 14 and 15. The interconnecting lines such as 9 and 11 in FIG. 3, may be omitted. The interlacing spiral arrangement of the conductor strips necessarily subdivide the electrostrictive material into spirally extending zones, any two of the neighboring zones being oppositely polarized. This embodiment as well as the one shown in FIG. 3 has bending or flexing axes extending substantially symmetrically in radial direction.

It is often advantageous to embed the conductor strips in the electrostrictive material. FIG. 5 shows an example of such arrangement. The electric field by which the zones between the conductor strips are polarized is in such a case substantially formed in the direction of the bending or flexing axis. A particularly great part of the electrical energy is thereby utilized in the outer layers for producing the flexing or bending action. The arrangement of conductor strips on both sides of the electrostrictive member serves the same purpose, namely, to increase the operatively effective bending action.

The flexing or bending oscillator shown in FIG. 5 is of elongated shape, the frontal end 16 being shown in section so as to bring out the position of the conductor strips 17/1, 17/2, etc., which are similarly arranged as in FIGS. 1 and 2 but embedded in the electrostrictive material. The arrangement of the two interconnecting lines 18 and 19 along the edges of the rectangular structure is likewise similar to the corresponding arrangement explained with reference to FIGS. 1 and 2. In order to support the flexing action, transverse conductor strips are also provided on the other side of the electrostrictive member, only the even numbered strips 20/2, 20/4 being indicated in FIG. 5. In order to obtain mutual cooperation with respect to the flexing or bending actions at the opposite sides of the elongated oscillator, the requirement must be fulfilled, namely, either that the respective oppositely disposed zones of the electrostrictive member are oppositely polarized, with the oppositely disposed transverse strips connected to the same poles of the oscillator, or that the oppositely disposed zones are polarized in the same sense, with the oppositely disposed transverse strips connected to different poles of the oscillator. It is assumed in FIG. 5, that oppositely disposed zones are polarized in the same sense. Oppositely disposed conductor strips such as 17/1 and 20/2 are therefore connected to two different connecting lines 19 and 18, respectively. The same is true so far as the remaining conductor strips are concerned.

FIG. 6 shows a flexing oscillator in which the electrostrictive material 22/1 and 22/2 is provided upon a disk shaped elastic carrier 21. Such an embodiment is desirable when the flexing oscillator is to be used as a membrane or diaphragm for an electroacoustical converter. If the elastic carrier is clamped in position at its outer rim, as is assumed in FIG. 6, the ring shaped marginal zone 22/2 will upon actuation of the carrier have another curvature sense than the circular center surface 22/1. If the electrostrictive material would cover the entire surface of the carrier on one side thereof, the bending or flexing action of the electrostrictive effect would be opposed at some points to the bending curve which depends upon the clamping of the carrier. The desired effect would thereby be reduced. The electrostrictive material shall therefore not cover the entire surface of the carrier but only those partial surfaces which have the same curvature sense. Accordingly, in FIG. 6, the electrostrictive material is arranged on one side of the carrier in the central part while being arranged on the other side at the rim thereof.

FIG. 7 shows the embodiment of an elongated flexing oscillator constructed as a quadrupole. The conductor strips are arranged as explained in connection with FIGS. 1 and 2. However, the even numbered and odd numbered conductor strips are subdivided into groups or portions 23 and 26, the first group being provided with lines or leads extending to terminals or poles 24, 25 and the second group being similarly provided with leads extending to poles 28, 29, thus forming an electrical quadrupole. An embodiment of this kind is particularly adapted for use as a filter element for high quality electric filters.

The flexing oscillators explained in the foregoing are advantageously used for the conversion of electrical energy into mechanical energy, for example, as electroacoustic converters, or as high quality frequency determining dipoles or quadrupole elements in electrical filters or feedback coupling networks for oscillation generators. One or the other embodiment will be preferred depending upon the particular use to which it is to be put.

Changes may be made within the scope and spirit of the appended claims which define what is believed to be new and desired to have protected by Letters Patent.

I claim:

1. A flexing oscillator, comprising a member made of electrostrictive material, strips of conductive material provided upon said member, such strips being embedded in the material of the electrostrictive member and subdividing the surface of said member into a plurality of zones which extend in a direction perpendicular to the flexing axis thereof, any two successive zones of the electrostrictive material being in the outer layers thereof oppositely polarized, and line means for interconnecting the respective alternate strips, and for interconnecting the respective intermediate strips therebetween, said line means forming the respective poles of the oscillator.

2. A flexing oscillator, comprising a member made of electrostrictive material, said member being of circular disk-like configuration, strips of conductive material provided upon said member, such strips extending thereon in the form of concentric rings and subdividing the surface of said member into a plurality of zones which extend in a direction perpendicular to the flexing axis thereof, any two successive zones of the electrostrictive material being in the outer layers thereof oppositely polarized, and line means for interconnecting the respective alternate strips, and for interconnecting the respective intermediate strips therebetween, said line means forming the respective poles of the oscillator.

3. A flexing oscillator, comprising an elastic carrier for supporting electrostrictive material, electrostrictive material disposed on said carrier along partial surface portions thereof which are in accordance with the mounting of such carrier identically curved, strips of conductive material provided upon said material, such strips subdividing the surface of said material into a plurality of zones which extend in a direction perpendicular to the flexing axis thereof, any two successive zones of the electrostrictive material being in the outer layers thereof oppositely polarized, and line means for interconnecting the respective alternate strips, and for interconnecting the respective intermediate strips therebetween, said line means forming the respective poles of the oscillator.

4. A flexing oscillator, comprising a member made of electrostrictive material, strips of conductive material provided upon said member, such strips subdividing the surface of said member into a plurality of zones which extend in a direction perpendicular to the flexing axis thereof, any two successive zones of the electrostrictive material being in the outer layers thereof oppositely polarized, and line means for interconnecting the respective even numbered and odd numbered strips, said line means forming the respective poles of the oscillator, said conductive strips being arranged on said electrostrictive member in two groups with individual poles for each group, thereby forming an electrical quadrupole.

References Cited in the file of this patent

UNITED STATES PATENTS

| | | |
|---|---|---|
| Re. 23,813 | Adler | Apr. 20, 1954 |
| 2,262,966 | Rohde | Nov. 18, 1941 |
| 2,914,686 | Clements et al. | Nov. 24, 1959 |